United States Patent [19]

Peterson

[11] 4,341,499
[45] Jul. 27, 1982

[54] BLADE RETENTION SYSTEM
[75] Inventor: Robert R. Peterson, Hudson, Mass.
[73] Assignee: Barry Wright Corporation, Newton, Mass.
[21] Appl. No.: 133,015
[22] Filed: Mar. 24, 1980
[51] Int. Cl.³ .............................................. B64C 27/38
[52] U.S. Cl. .................................. 416/134 A; 416/141
[58] Field of Search .......... 416/134 A, 138 R, 138 A, 416/141, 107, 140 A

[56] References Cited
U.S. PATENT DOCUMENTS

| 2,169,849 | 8/1939 | Pitcairn | 416/135 X |
| 3,556,673 | 1/1971 | Killian | 416/134 A |
| 3,790,302 | 2/1974 | Pascher | 416/141 X |
| 3,862,812 | 1/1975 | Gorndt et al. | 416/141 |
| 4,135,856 | 1/1979 | McGuire | 416/134 A |
| 4,232,563 | 11/1980 | Peterson | 416/141 X |
| 4,249,862 | 2/1981 | Waddington et al. | 416/140 X |

FOREIGN PATENT DOCUMENTS

| 1048155 | 12/1958 | Fed. Rep. of Germany | 416/141 |
| 934336 | 5/1948 | France | 416/134 A |
| 1328744 | 8/1973 | United Kingdom | 416/134 A |

Primary Examiner—Everette A. Powell, Jr.
Attorney, Agent, or Firm—Milton E. Gilbert; Gary E. Ross

[57] ABSTRACT

A blade retention system for use in a fully articulated rotor head of a rotary wing aircraft is described. The retention system comprises a separate elastomeric bearing means for carrying loads in compression and accommodating motions about the respective flapping, lead-lag, and pitching axes of the rotor head in shear for each type of motion about the respective flapping, lead-lag and pitching axes of the rotor head.

21 Claims, 10 Drawing Figures

FIG. 1
PRIOR ART

BLADE RETENTION SYSTEM

The present invention generally relates to rotary wing aircraft and more particularly to a rotor blade retention system suitable for use in rotary wing aircraft such as helicopters and Autogyro systems.

The number of blades that have been used on rotors of rotary wing aircraft include as little as one counter-weighted blade and as many as a particular design may call for, with anywhere from two to five blades being the most common. The various types of rotors include articulated rotors, semi-"rigid" or floating hub rotors, fully "rigid" rotors, and flex hinge or strap hinge rotors.

Articulated rotors, the type of which the present invention pertains, are generally those in which each blade is attached to the rotor hub by a rotor blade retention system comprising separate pivotal connections for each movement desired. For example, in a typical fully articulated rotor system, three separate connections are provided so that each blade is allowed to (1) pivot about a horizontal axis in and out of the plane of rotation so as to provide "flapping" motion, (2) pivot about a vertical axis relative to the other blades within the plane of rotation so as to provide "lead-lag" motion, and (3) rotate about a radially-directed axis within the plane of rotation so as to provide "pitching" or "feathering" motion. These prior art connections often include precision roller bearings for permitting pivotal movement of the blade about the lead-lag and flapping axes and rotation about the pitch or feathering axis. Simultaneously, each of these connections must restrain movement of the blade against centrifugal forces imposed thereon during rotation of the rotor system. The need for constant maintenance and lubrication of the precision roller bearings as well as the combination of loads and motions can result in premature failure of these connections.

Accordingly, designers of rotor systems have turned their attention to elastomeric bearings comprising alternating and bonded layers of rigid and elastomeric materials to overcome the disadvantages of these precision roller bearings. Examples of such designs are shown and described in U.S. Pat. Nos. 3,556,673; 3,764,230; 3,778,189; 3,782,854; 3,790,302; 3,804,552; 3,862,812; 3,932,059; 3,942,910; 4,028,001; 4,028,002; 4,063,787; 4,141,664 and the references cited therein. These types of bearings are characterized in their ability to withstand high compressive loads normal to the layers without excessive bulging of the elastomer, while the elastomer is capable of accommodating motion from torsion and or shear. Elastomeric bearings also do not require lubrication, and therefore do not require the constant maintenance that the precision roller bearings require.

In the design of rotor blade retention systems utilizing elastomeric bearings, the designer traditionally has considered numerous factors. In addition to the design of the bearings to restrain the blade against the centrifugal force imposed thereon during rotation of the rotor hub and to accommodate the various motions of the blade relative to the rotor hub, consideration has also been given to but not limited to the fatigue life of the bearings under these loads and motion conditions, the weight and size of the bearings and structural interconnections, the spring rate of the bearings in various modes, and the ability of the retention system to carry the blade shear loads. Accordingly, the traditional design of rotor blade retention systems utilizing elastomeric bearings are such that any motion of the rotor is constrained by all the bearings. For example, in the design shown and described in U.S. Pat. No. 3,790,302, the bearings are designed to provide a distributed moment constraint. More particularly, any one motion of the blade and blade grip is restrained by a combination of the several bearings shown. For this reason, spherical bearings are typically used in such designs. By providing designs of a distributed moment constraint, although the design may be less prone to fatigue, several disadvantages are encountered. For one, since each bearing accommodates more than one type of motion, sacrifices in the design of each bearing must be made in the restraint of one motion in order to accommodate restraint of another motion. For example, in U.S. Pat. No. 3,862,812 a design is provided for a fully articulated elastomeric rotor head using a spherical bearing to accommodate flap, lead-lag and pitch in one bearing element. Other designs use a separate thrust bearing carrying some of the pitch motion but lead-lag and flap are still carried in a single spherical bearing section. The spherical section is typically quite large because it must provide for both flap, lead-lag and some pitch. Further, by tailoring one bearing so that it accommodates different types of motion, the designer is sacrificing some space or bearing life since he cannot design the system for both.

Another disadvantage of some of these systems is that because of the nature of the design it is necessary to incorporate in the design blade folding mechanisms which are heavy and complex features of multi-bladed rotor heads. For example, see U.S. Pat. No. 4,028,001.

It is therefore an object of the present invention to overcome or substantially reduce problems of the prior art.

Another object of the present invention is to provide a separate elastomeric bearing for each of the three angular motions in a fully articulated rotor head.

And another object of the present invention is to provide a fully articulated rotor head assembly design in which each elastomeric bearing is designed to be tailored to accommodate a single angular motion about its axis allowing maximum service life with minimum size and weight.

Still another object of the present invention is to provide a blade retention system providing a motor inexpensive design wherein each elastomeric bearing is independent of the whole system and can be replaced on a modular concept basis further reducing costs.

Yet another object of the present invention is to provide a separate bearing for each of the three angular motions in a fully articulated rotor head with the lead-lag pivot elastomeric bearing being designed to allow the blades to be folded, for parking and storage thus eliminating the prior art heavy and complex folding mechanisms of multi-bladed heads.

The foregoing and other objects are achieved by a blade retention system for use in a fully articulated rotor head of a rotary wing aircraft, the system comprising a separate elastomeric bearing for each of the three angular motions. In the preferred system all motions are restrained by simple, non-spherical bearings.

Other features and many of the attendant advantages of the invention are disclosed in or rendered obvious by the following detailed description which is to be considered together with the accompanying drawings in which:

In the drawings, the same numerals are used to refer to similar parts.

Figure 1:
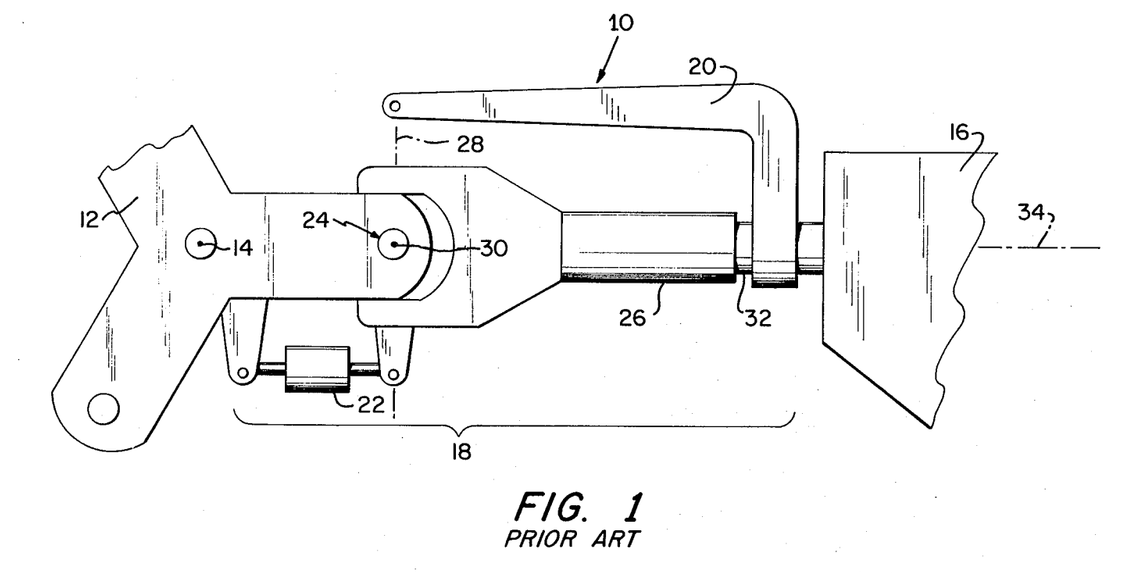
FIG. 1 is a schematic drawing of a top view of the plane of rotation of the type of fully articulated rotor head to which the present invention pertains.

Referring to the drawings, the present invention is particularly adapted to be utilized with the type of fully articulated rotor head assembly shown schematically and generally designated 10 in FIG. 1. The assembly 10 is shown as a three blade rotor system although the number of blades can vary. Generally, the assembly 10 comprises a rotor head 12 rotatable about a central axis 14, blades 16 (only one being shown in FIG. 1), a blade retention system 18 for coupling each blade to the rotor head 12 so that each blade 16 is rotatable about the central axis 14, pitch control mechanism 20 and mechanical damping means 22.

The blade retention system 18 generally couples a blade 16 to the rotor head 12. In particular, system 18 includes a coupling 24 for coupling the system to the rotor head 12 and a coupling generally indicated at 26 for coupling the system to the blade 16. Coupling 24 is of a type to permit the blade 16 to pivot about the flapping axis 28 in and out of the plane of rotation and the lead-lag axis 30, the latter being orthogonol to flapping axis 28 and the plane of rotation and therefore perpendicular to the plane depicted in FIG. 1. Coupling 24 is shown as a universal joint of the "single joint Cardan" type and thus axes 28 and 30 intersect. Alternatively, coupling 24 may include separate hinges offset from one another to define offset flapping and lead-lag axes. The blade 16 as shown includes shaft 32 mounted with respect to coupling 26 and thus retention system 18 so that the blade can rotate at least to a limited extent about the pitching or feathering axis 34. Pitching axis 34 is orthogonal to and intersects each of the flapping and lead-lag axes, regardless of whether the coupling 24 is designed so that the latter two axes intersect or not. In general, as well known in the art, pitch control mechanism 20 controls the pitch of blade 16 by rotating the latter about the pitching axis 34 while the blade is rotating about central axis 14, while damping means 22 prevents ground resonance from occurring. The system 18 to the extent described above, is referred to in "Introduction to Helicopter Analysis and Design" by Dr. Henry R. Velkoff, Professor of Mechanical Engineering at Ohio State University, pages 15 and 16.

In accordance with the present invention the blade retention system 18 is provided with (1) elastomeric flap bearing means for carrying in shear substantially all flapping motion of the blade 16 about the flapping axis 28; (2) elastomeric lead-lag bearing means separate from the flap bearing means for carrying in shear substantially all lead-lag motion of the blade 16 about the lead-lag axis 30; and (3) elastomeric pitch and thrust bearing means, separate from the flap and lead-lag bearing means, for carrying in shear substantially all pitching motion of the blade 16 about the pitching axis 34. All of the elastomeric bearing means carry centrifugal loads provided by the rotation of the blade 16 about the central axis 14 substantially entirely in compression. By designing the retention system 18 in this manner, each of the elastomeric bearing means can be optimally designed and tailored to carry the respective motion in shear providing greater control and thus achieving a better aerodynamic design while obtaining the benefits of elastomeric bearings.

Referring to FIGS. 2-10 of the drawings, as preferred, all of the embodiments shown are provided with non-spherical bearings, and in particular preferably utilize elastomeric bearing units of alternating and bonded layers of elastomeric and nonextensible material (such as rubber and metal, respectively), the bearing unit having a simple geometric construction, e.g. cylindrical, frusto-conical or flat, or any one of various combinations of these shapes, so that they are inexpensive and can easily be manufactured and replaced on a modular basis. Preferably, the flapping and lead-lag bearing units are at least in part of the cylindrical type, while the pitch bearing is either of the cylindrical, frusto-conical, flat, or a combination of two or more types.

Figure 2:
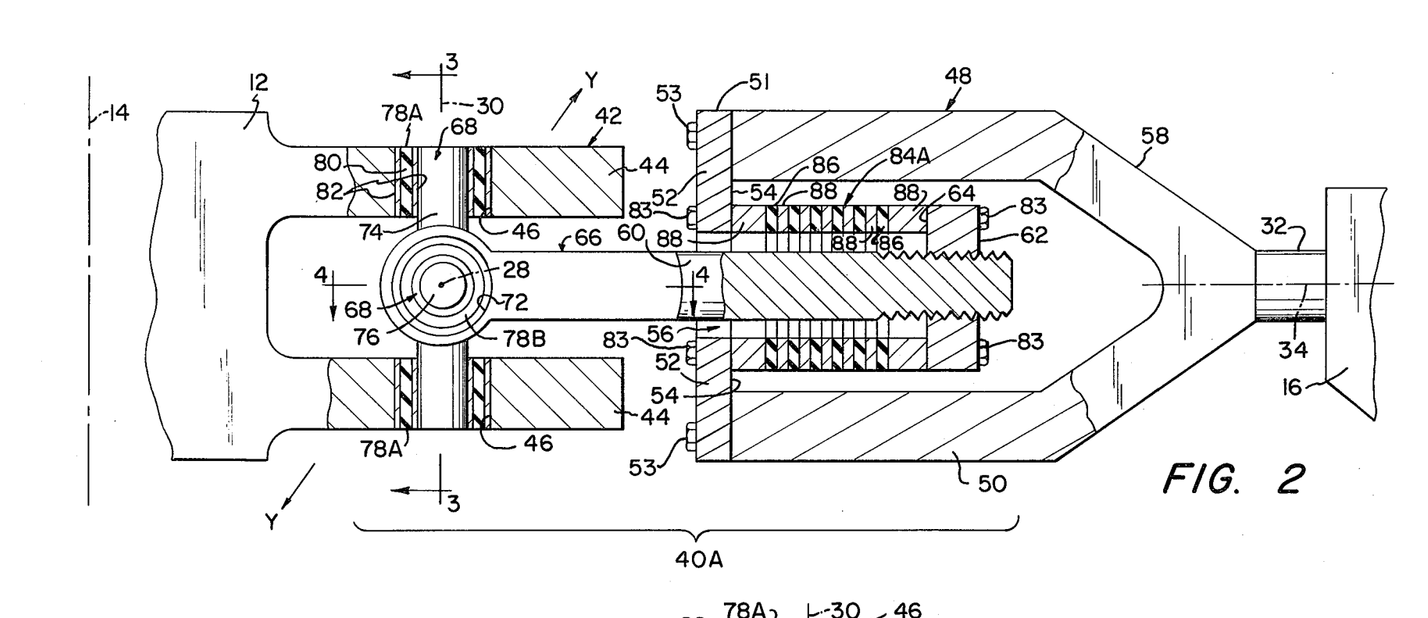
FIG. 2 is a cross-sectional view of the blade retention system of FIG. 1 incorporating a first embodiment of the present invention.
Figure 3:
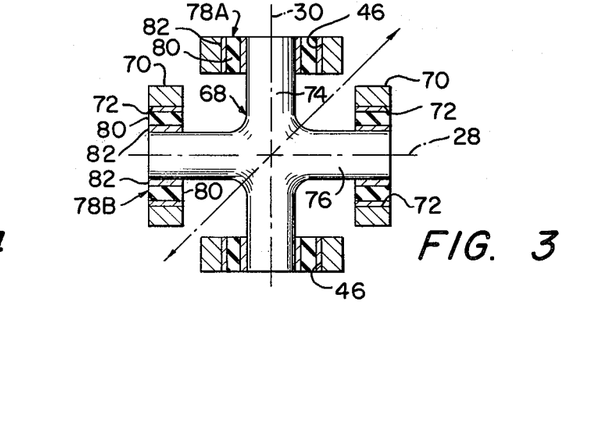
FIG. 3 is a cross-sectional view taken along line 3—3 of FIG. 2.
Figure 4:
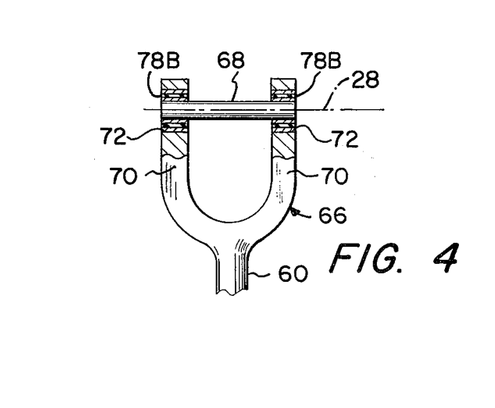
FIG. 4 is a partial cross-sectional view taken along lines 4—4 of FIG. 2 (and rotated 90°)

Referring to FIGS. 2-4, the embodiment shown generally comprises a rotor blade retention system 40A for coupling the rotor head 12 and the blade 16. More specifically, rotor head 12 comprises a fork yoke 42, the latter including two bosses 44. Bosses 44 include respective apertures 46, disposed coaxially with respect to one another, as well as to the lead-lag axis 30.

Blade 16 includes the shaft 32 which terminates in the coupling end 48. The latter is preferably in the form of a hollow cylindrical section 50, the inboard end of which is provided with an annular inward radially-extending flange 52 (being provided, for example, as shown by an annular plate 51 suitably coupled to the section 50 by bolts 53) which defines (1) an annular shoulder 54 on the outboard side of the flange and (2) a reduced diameter opening 56. The outboard end of section 50 tapers as a conical portion 58 down to the shaft 32 of the blade 16.

The retention system 40A of FIG. 2 comprises a load bearing shaft 60 having its central axis aligned with the pitching axis 34 when properly coupled to the blade as shown. Shaft 60 has at least at the center portion extending through opening 56 a cross-sectional dimension less than the minimum cross-sectional dimension of the opening 56 so that the shaft easily fits and is adapted for limited movement within the opening. Shaft 60 has at its outboard end an annular outward radially-extending flange 62 (being formed, for example, as shown by securing an annular ring on the threaded end of shaft 60) disposed so as to define an annular shoulder 64 facing the shoulder 54 of flange 52, and within the section 50 of blade 16 at its inboard end, a forked yoke 66 for connection with coupling member 68. Flange 62 is preferably sized so as to have a maximum radial dimension larger than that of opening 56 and smaller than the external dimensions of the hollow cylindrical cavity formed by section 50. Forked yoke 66 (shown best in FIG. 4) includes two bosses 70 having respective apertures 72 coaxially aligned with one another and the flapping axis 28.

Coupling member 68 is preferably of the type which forms with fork yokes 42 and 66 a single-joint Cardan universal coupling. Accordingly, member 68 is a cross-member having a vertical cross-bar 74 adapted to be mounted at opposite ends in apertures 46 coaxially with lead-lag axis 30 and a horizontal cross-bar 76 integrally joined to cross-bar 74 and adapted to be mounted at opposite ends in apertures 72 coaxially with flapping axis 28. The portions of cross-bars 70 and 72 disposed within the respective apertures 46 and 72 as well as the apertures 46 and 72 are preferably cylindrical in cross-section with the cross-sectional diameter of each portion of the cross-bar being sufficiently smaller than the respective aperture so as to receive in a tight fitting relation a cylindrical bearing unit 78. Each bearing unit 78 has an axis of revolution aligned with the respective flapping and lead-lag axes and comprises alternating and bonded layers 80 and 82, respectively of elastomeric and nonextensible material with the design of each unit, including the number of layers, durometer of the elastomeric material of each such layer, thickness of each layer, etc. being dependent upon the particular expected loads and motions. In particular the bearing units 78A mounted in the two apertures 46 are preferably identical to one another and are optimally designed to restrain motion of the blade 16 about the lead-lag axis 30 and carry such motion in shear. In a similar manner the bearing units 78B mounted in the two apertures 68 are preferably identical to one another and are optimally designed to restrain motion of the blade 16 about the flapping axis 28 and carry such motion in shear. It should be noted that bearing unit 78A is substantially unaffected by flapping motion, while bearing unit 78B is substantially unaffected by lead-lag motion.

Pitch motion, i.e., rotation of blade 16 about axis 34 is permitted by bearing unit 84A which couples the blade 16 to shaft 60. More particularly, in the embodiment of FIG. 2, the pitch bearing unit 84A includes alternating and bonded flat annular layers 86 and 88 respectively of elastomeric and non-extensible material each having an axis of revolution coaxially aligned with one another as well as the axis 34 and disposed between and is suitably secured (with, for example, bolts 83) to shoulder 54 of flange 52 and shoulder 64 of flange 62 of shaft 60. Unit 84A is optimally designed to carry in shear all pitching motion of blade 16 about the axis 32, while being substantially unaffected by any lead-lag or flapping motion.

All of the bearing units 78A, 78B and 84 will also carry in compression all thrust loads created by centrifugal forces resulting from the rotation of blade 16 about central axis 14. Thus, each of the flapping, lead-lag and pitch bearing units 78A, 78B and 84 respectively can be optimally designed for the respective motion while carrying compressive loads resulting from thrust.

Figure 5:
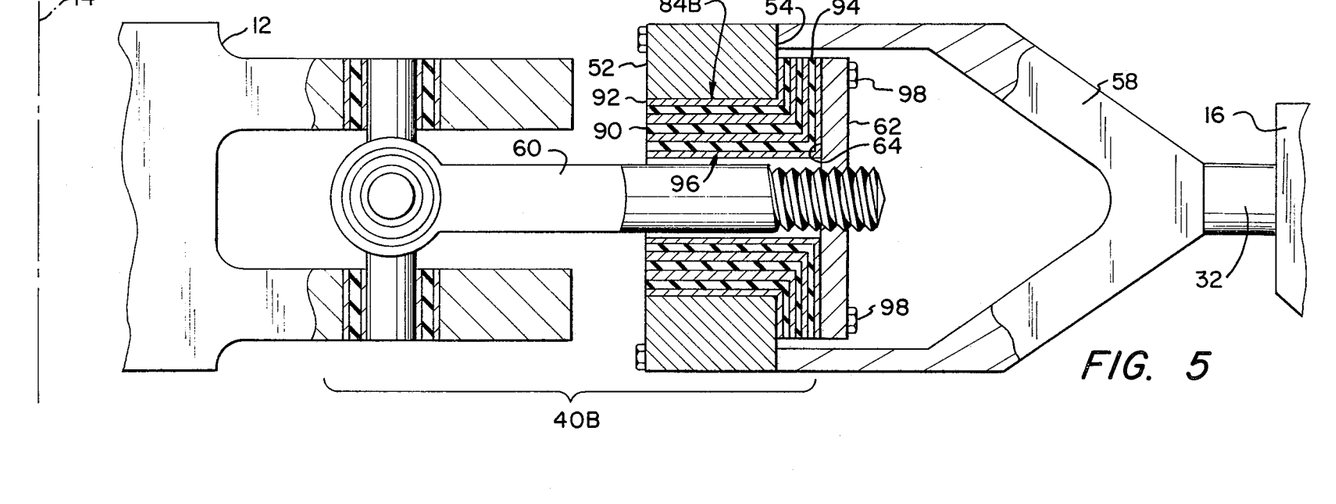
FIG. 5 is a cross-sectional view of a blade retention system of FIG. 1 incorporating a second embodiment of the present invention.

In FIG. 5, the embodiment shown is identical to the embodiment shown in FIG. 2, except that the blade retention system 40B is modified by replacing the flat annular pitch bearing unit 84A with a combination flat annular and cylindrical pitch bearing unit 84B. The combined pitch bearing unit 84B generally includes alternating and bonded layers 90 and 92, respectively of elastomeric and nonextensible material, each layer having a cylindrical portion and an annular outwardly radially-directed flange portion at the outboard end of the unit. The cylindrical portions indicated generally at 96 of the layers of the bearing unit prevent significant relative movement between the center axes of shaft 60 and shaft 32. Cylindrical portions 96 are secured in opening 56 between shaft 60 and the internal edge of flange 52 of section 50 of blade 16, while the flange portions, generally indicated at 94 of the layers of the bearing unit 84B are secured between the shoulder 54 of flange 52 of section 50 and the shoulder 64 formed by flange 62 of shaft 58. The bearing unit 84B may be secured in place by any suitable means, such as bolts 98, the latter extending through flange 62 and being secured to the flange portions 94 of the bearing unit. The layers of the combined pitch bearing unit 84B have an axis of revolution coaxial with the pitch axis 34 so that the layers (both portions 94 and 96) carry in shear substantially all motion of the blade 16 about the pitching axis 34, while the flat annular portions 94 of the layers carry in compression thrust resulting from centrifugal forces as blade 16 rotates about the central axis 14.

Figure 6:
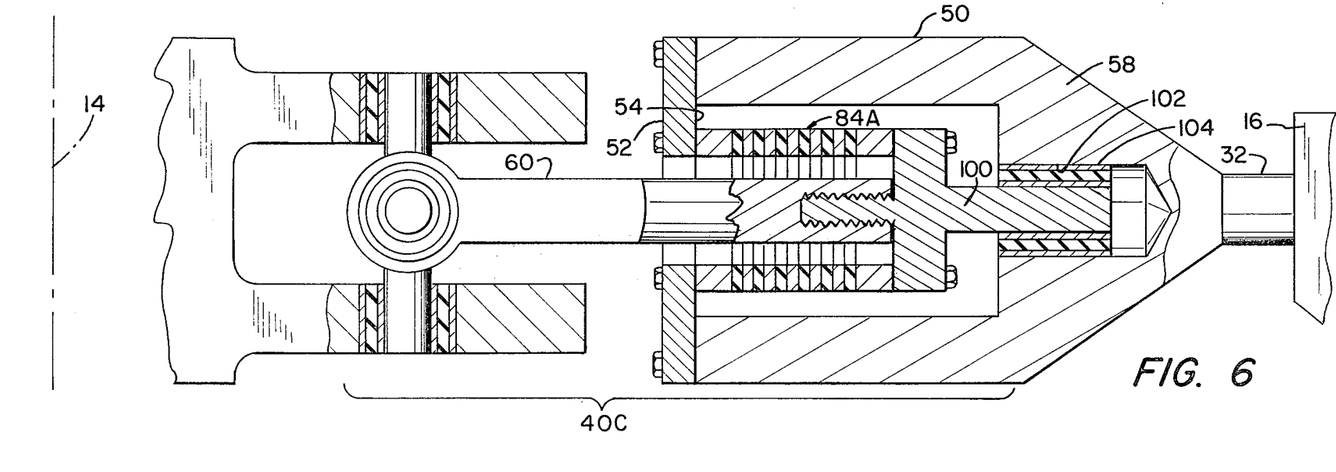
FIG. 6 is a cross-sectional view of a blade retention system of FIG. 1 incorporating a third embodiment of the present invention.

Referring to FIG. 6, the embodiment shown is a modification to the embodiment shown in FIG. 2. In particular the blade retention system 40C is identical to system 40A with the exception that the shaft 60 is provided at its outboard with an integrally-formed shaft extension 100, while the conical portion 58 is provided with a counter bore 102 for receiving the end of shaft extension 100. The internal diameter of counter bore 102 is larger than the outer diameter of the extension 100 so that an additional cylindrical elastomeric pitch bearing unit 104 can be tightly disposed within the counter bore 102 around the extension 100 coaxially with the pitch axis 34. Unit 104 preferably comprises alternating and bonded cylindrical layers of elastomeric and nonextensible material having an axis of revolution aligned with pitch axis 34. Both bearing units 84A and 104 are adapted to carry in shear all pitching motion while the bearing unit 104 also prevents an appreciable relative motion between the center axis of shaft 32 and the center axis of shaft 60 and extension 100. Additionally, due to the greater resistance to compression than to shear, any lead-lag or flapping motion will still be substantially carried in shear by the respective cylindrical bearing units 78A and 78B respectively.

Figure 7:
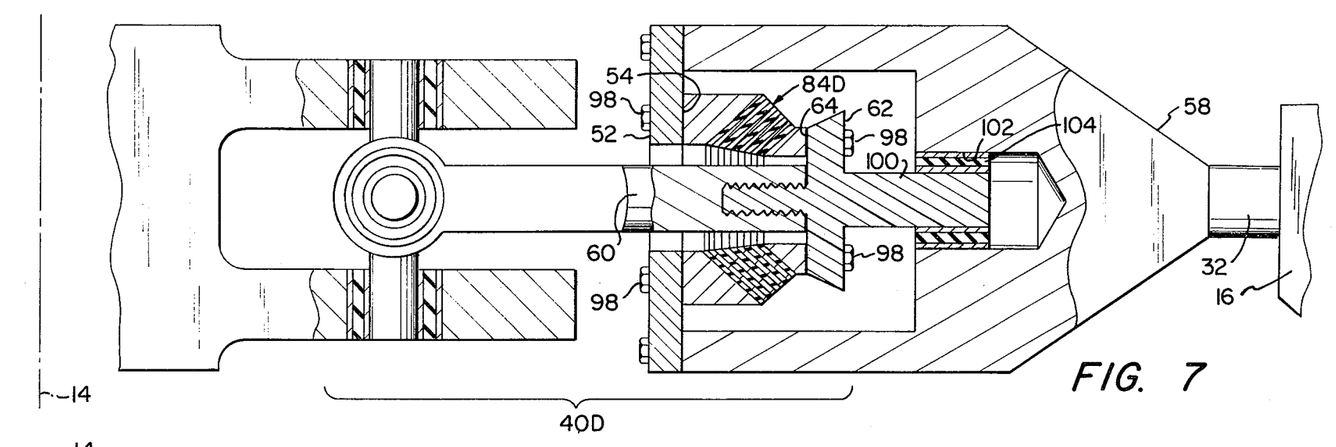
FIG. 7 is a cross-sectional view of a blade retention system of FIG. 1 incorporating a fourth embodiment of the present invention.

Referring to the retention system 40D shown in FIG. 7, the embodiment of FIG. 6 is modified wherein a frusto-conical bearing unit 84D is substituted for the flat annular bearing unit 84A. The apex end of the frusto-conical bearing unit 84D is connected inboard, to the shoulder 54 of flange 52 of section 50 and the base end of the unit 84D is connected outboard to the shoulder 64 of flange 62 of shaft 60, all by any suitable means such as bolts 98 extending through the respective flanges and securing the unit thereof. The conical bearing unit 84D generally includes alternating and bonded frusto-conical layers of elastomeric and nonextensible material having a common axis of revolution aligned with the pitch axis 34. The unit 84D will thus carry in shear substantially all motion of blade 16 about its pitch axis 34. Unit 84D will also carry in compression thrust loads resulting from centrifugal forces as the blade 16 rotates about the central axis 14.

Figure 8:
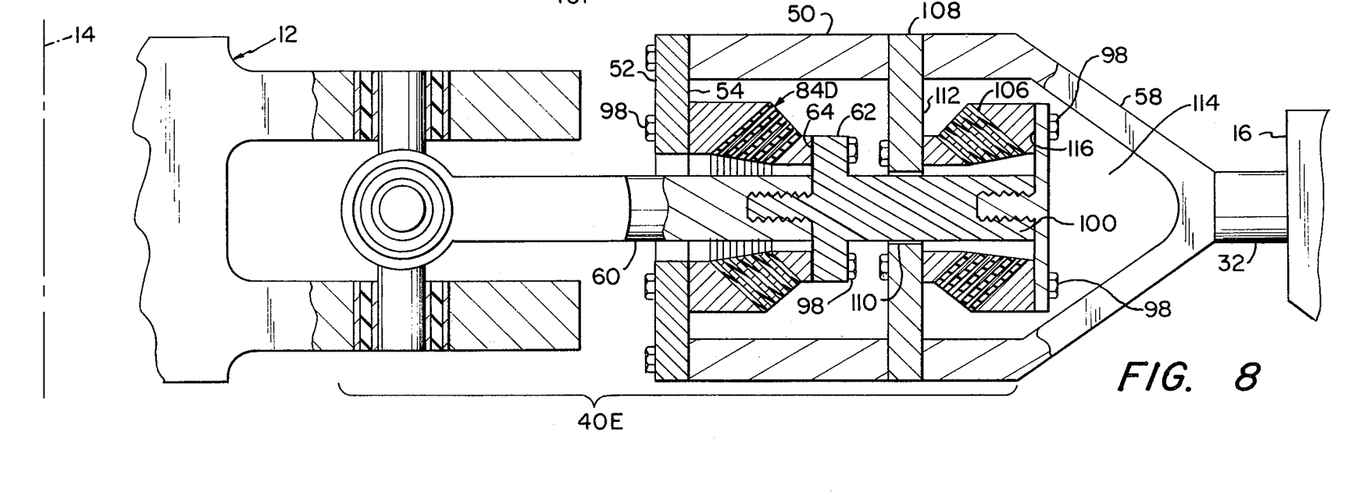
FIG. 8 is a cross-sectional view of a blade retention system of FIG. 1 incorporating a fifth embodiment of the present invention.

In FIG. 8, the FIG. 7 embodiment is modified by substituting a frusto-conical bearing unit 106 for the cylindrical pitch bearing unit 104. More particularly, an additional internal inwardly radially-directed flange 108 (defining an opening 110 of reduced diameter and an annular shoulder 112 at its outboard side) is provided within the hollow section 50 of blade 16 and shaft extension 100 extends through opening 110 and is provided with the additional annular outward radially-directed flange 114 at its outboard end defining a shoulder 116 opposite shoulder 112 of flange 108. Frusto-conical bearing unit 106 is secured by any suitable means such as bolts 98 between and to shoulders 112 and 116 with the base end of the bearing unit adjacent shoulder 112 and the apex of the bearing unit adjacent shoulder 116. The central axis of revolution defined by the frusto-conical bearing unit 106 is coaxial with the pitch axis 34. Both frusto-conical bearing units 84D and 106 carry in shear substantially all rotational motion of blade 16 about the pitch axis 34, while both carry in compression the thrust attributed to centrifugal forces as blade 16 rotates about central axis 14. The internal conical angle of unit 84D is opposite to that of unit 106 so that in plane moment reactions do not cause a loading along the axis of shaft 60.

Although the conical bearing unit 84D of the FIGS. 7 and 8 embodiments is shown in both Figs. oriented with the apex of the bearing unit facing inboard, and the conical bearing unit 106 of the FIG. 8 embodiment is shown oriented with the apex of this bearing unit facing outboard, the units can be reversed in their orientation. Thus, the conical bearing unit 84D of the FIGS. 7 and 8 embodiments can be oriented with its apex facing outboard and the apex of conical bearing unit 106 of FIG. 8 can be oriented with its apex facing inboard.

Figure 9:
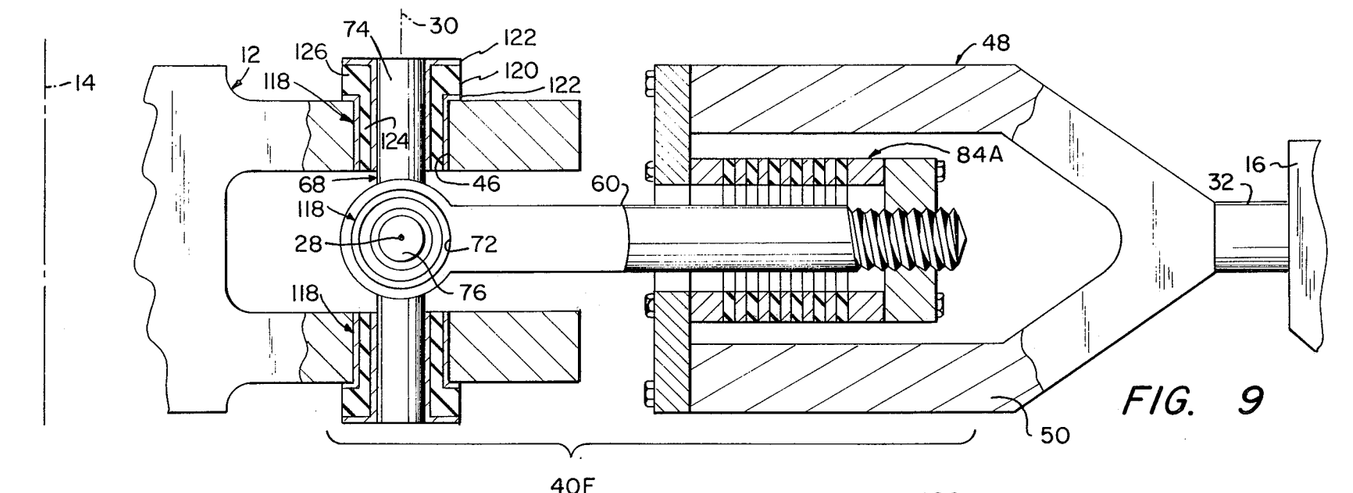
FIG. 9 is a cross-sectional view of the blade retention system of FIG. 1 incorporating a sixth embodiment of the present invention.

FIGS. 2-8 show embodiments wherein various radial and thrust bearing units (i.e., the pitch bearing units 84A, 84B, 84D, cylindrical bearing unit 104 and frusto-conical bearing unit 106) are utilized. In addition to the modifications described and illustrated, other modifications can be made without departing from the scope of the present invention. In addition, variations in the flapping and lead-lag bearing units can be made. For example, as shown in FIG. 9, the blade retention system 40F is identical to system 40A of FIG. 2, except that a combined flat annular and cylindrical bearing unit 118 is substituted for each of the cylindrical flapping bearing units 78A and/or each of the cylindrical lead-lag bearing units 78B. In particular, each combined bearing unit 118 generally includes alternating and bonded layers 120 and 122, respectively of elastomeric and nonextensible material, each layer having a cylindrical portion and an annular outward radially-directed flange portion at the outermost radial position from the intersection of the flapping and lead-lag axes. The cylindrical portions, generally indicated at 124, of the layers of the bearing unit are secured in the apertures 46 and/or apertures 72 while the flat annular portions, indicated generally at 126, of the layers of the bearing units are positioned adjacent the radially outer surface of the respective bosses 44 and 70. The layers of the combined bearing unit have a central axis coaxial with the respective flapping and lead-lag axes so that the particular layers of both the cylindrical portions 124 and flat annular portions 126 accommodate in shear substantially all motion of the blade 16 about the corresponding flapping and lead-lag axes 28 and 30.

Figure 10:
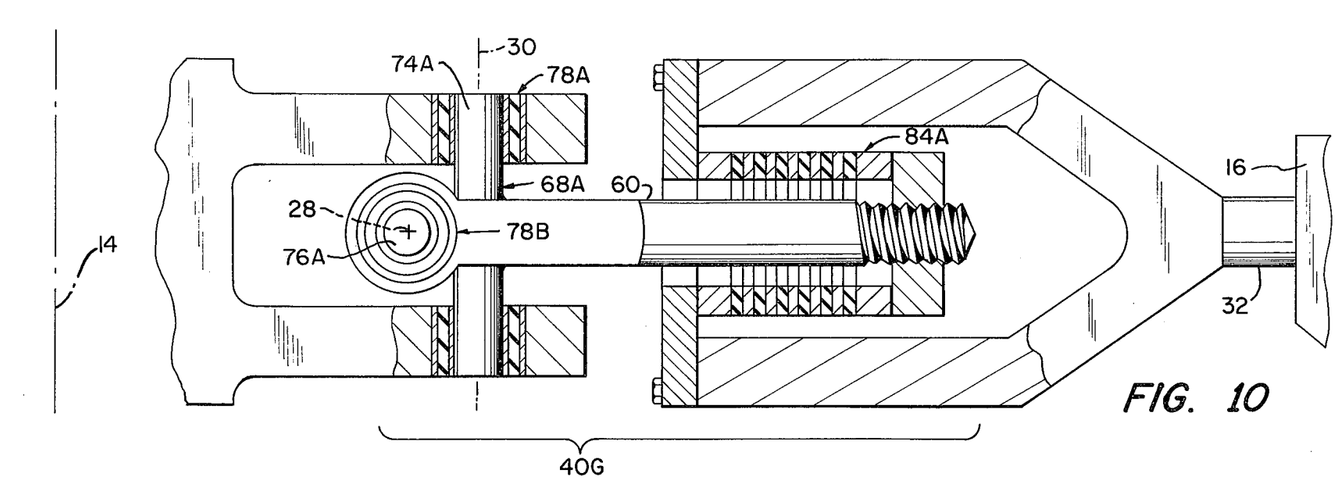
FIG. 10 is a cross-sectional view of the blade retention system of FIG. 1 incorporating a seventh embodiment of the present invention.

Alternatively, the retention system can be modified as shown in the embodiment of FIG. 10. In particular, the blade retention system 40A of FIG. 2 utilizes a coupling member 68 of the single-joint Cardan universal type wherein the flapping and lead-lag axes are mutually orthogonal with one another as well as to pitch axis 34. Alternatively, the coupling member can be shaped as shown in FIG. 10 so that the cross-bars 74A and 76A are displaced from one another and the flapping and lead lag axes are offset from one another along the pitch axis 34.

The invention has been described in accordance with the various embodiments depicted in FIGS. 2-10. The particular design configuration of the blade retention system will depend upon the particular requirements that must be met. However, by providing a separate non-spherical elastomeric bearing unit for each of the corresponding three angular motions in a fully articulated rotor head, each unit can be optimally, yet inexpensively designed for the particular motion providing greater control, maximum service life with minimum size and weight, and replaced on a modular concept basis further reducing costs. Further, by utilizing simple non-spherical bearing units the blades can easily be made to be folded, for packing and storage thus eliminating the prior art heavy complex folding mechanisms of multi-bladed heads. In particular, by way of example as shown in FIG. 10, the vertical cross-bar 74A can be removed allowing blade 16 to rotate about the flapping axis 28 to a folded position.

Since certain changes may be made in the above system without departing from the scope of the invention herein involved, it is intended that all matter contained in the above description or shown in the accompanying drawings shall be interpreted as illustrative and not in a limiting sense.

What is claimed is:

1. In a fully articulated rotor head of a rotary wing aircraft of the type including a rotor head rotatable about a central axis and at least one blade, an improved rotor blade retention system for coupling said head to said blade, said system comprising:
   retention means comprising (1) elastomeric flap bearing for carrying in shear substantially all and only the flapping motion of said blade about its flapping axis, (2) elastomeric lead-lag bearing, separate from said flap bearing means, for carrying in shear substantially all and only the lead-lag motion of said blade about its lead-lag axis, and (3) elastomeric pitch bearing, separate from said flap and lead-lag bearing, for carrying in shear substantially all and only the pitching motion of said blade about its pitch axis;
   wherein all of said elastomeric bearing means carry centrifugal loads provided by the rotation of said blade about said central axis substantially entirely in compression.

2. A system according to claim 1, wherein each of said bearings comprises non-spherical, alternating layers of elastomeric and non-extensible material.

3. A system according to claim 2, wherein said flapping axis, said lead-lag axis and said pitching axis are mutually orthogonal to one another intersecting at a point so that said flap bearing means and said lead-lag bearing means form a universal coupling between said rotor head and said system.

4. A system according to claim 2, wherein said flapping axis and lead-lag axis are orthogonal to said pitching axis and offset from one another.

5. A system according to claim 2, wherein said flap bearing means and said lead-lag bearing means each comprise a pair of cylindrical elastomeric bearing units, each of said units having an axis of revolution aligned with the corresponding one of said flapping and lead-lag axes.

6. A system according to claim 5, wherein said flap bearing means and said lead-lag bearing means each comprise a pair of combined flat annular and cylindrical bearing units, each of said units having an axis of revolution aligned with the corresponding one of said flapping and lead-lag axes.

7. A system according to claim 2, wherein said elastomeric pitch bearing means comprises a flat annular bearing unit of alternating flat annular layers of elastomeric and nonextensible material, said layers having an axis of revolution coincidental with said pitch axis.

8. A system according to claim 2, wherein said elastomeric pitch bearing means comprises a combined flat annular and cylindrical bearing unit of alternating layers of elastomeric and non-extensible material, said layers having an axis of revolution aligned with said pitch axis and include a cylindrical portion and a flat annular portion such that both of said portions carry in shear motion of said blade about said pitch axis, and said cylindrical portion carries in compression said centrifugal loads.

9. A system according to claim 2, wherein said elastomeric pitch bearing means comprises at least one frusto-conical bearing unit having an axis of revolution coinciding with said pitch axis.

10. A system according to claim 9, wherein said frusto-conical bearing unit comprises alternating frusto-conical layers of elastomeric and nonextensible material and includes an open end and a base end, said unit coupling said system to said blade wherein said apex end is inboard of said base end.

11. A system according to claim 10, wherein said pitch bearing means includes a second bearing unit for coupling said blade to said system.

12. A system according to claim 11, wherein said second bearing unit includes alternating cylindrical layers of elastomeric and nonextensible material said cylindrical layers having an axis of revolution coincidental to said pitch axis so as to carry in shear motion of said blade about said pitch axis.

13. A system according to claim 11, wherein said second bearing unit is a frusto-conical bearing unit comprising alternating layers of elastomeric and nonextensible material, said layers having an axis of revolution coincidental to said pitch axis, said frusto-conical bearing unit having an apex end and a base end wherein said apex end is outboard to said base end.

14. A system according to claim 2, further including a load-bearing shaft and a coupling member for coupling one end of said shaft to said rotor head, said blade including a hollow end portion at one end having an annular inwardly radially-directed flange defining an opening at said one end and a first annular shoulder within said hollow end portion, said shaft extending through said opening and including an annular outwardly radially-directed flange defining a second annular shoulder outboard from and facing said first shoulder, wherein said pitch bearing means is coupled to said shaft and said blade between said first and second annular shoulders.

15. A system according to claim 14, wherein said elastomeric pitch bearing means comprises a combined flat annular and cylindrical bearing unit of alternating layers of elastomeric and non-extensible material, said layers having an axis of revolution aligned with said pitch axis and include a cylindrical portion and a flat annular portion such that both of said portions carry in shear motion of said blade about said pitch axis, and said cylindrical portion carries in compression said centrifugal loads.

16. A system according to claim 14, wherein said elastomeric pitch bearing means comprises at least one frusto-conical bearing unit having an axis of revolution coinciding with said pitch axis.

17. A system according to claim 16, wherein said frusto-conical bearing unit comprises alternating frusto-conical layers of elastomeric and nonextensible material and includes an apex end and a base end, said unit coupling said system to said blade wherein said apex end is inboard base of said base end.

18. A system according to claim 17, wherein said shaft includes a shaft extension outboard from said annular outward radially-directed flange, and said pitch bearing means including a second bearing unit for coupling said shaft extension to said blade.

19. A system according to claim 18, wherein said second bearing unit includes alternating cylindrical layers of elastomeric and nonextensible material, said cylindrical layers having an axis of revolution coincidental with said pitch axis so as to carry in shear motion of said blade about said pitch axis.

20. A system according to claim 18, wherein said hollow portion of said blade includes a second annular inwardly radially-directed flange radially-spaced outboard from said first annular inwardly radially-directed flange, defining a second opening and a third annular shoulder within said hollow end portion, said shaft extension extending through said second opening and including a second annular outward radially-extending flange defining a fourth annular shoulder outboard from and facing said third annular shoulder, wherein said second bearing unit is coupled between said third and fourth shoulders.

21. A system according to claim 20, wherein said second bearing unit is a frusto-conical bearing unit comprising alternating layers of elastomeric and nonextensible material and having an apex end and a base end, wherein said apex end is outboard to said base end.

* * * * *